United States Patent
Kaihara et al.

(10) Patent No.: US 9,799,934 B2
(45) Date of Patent: Oct. 24, 2017

(54) VEHICLE ELECTRIC BATTERY CONTROLLING APPARATUS

(71) Applicant: MITSUBISHI JIDOSHA KOGYO KABUSHIKI KAISHA, Tokyo (JP)

(72) Inventors: Kuniaki Kaihara, Tokyo (JP); Shohei Kawano, Tokyo (JP); Hiroyuki Sakai, Tokyo (JP); Atsushi Kodama, Tokyo (JP); Yuya Suzuki, Tokyo (JP); Yoshiaki Nishio, Tokyo (JP); Hirofumi Yagura, Tokyo (JP); Makoto Kamachi, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 170 days.

(21) Appl. No.: 14/632,787

(22) Filed: Feb. 26, 2015

(65) Prior Publication Data

US 2015/0239405 A1   Aug. 27, 2015

(30) Foreign Application Priority Data

Feb. 27, 2014 (JP) ................................. 2014-036298

(51) Int. Cl.
  *H01M 10/63* (2014.01)
  *H01M 10/6571* (2014.01)
  (Continued)

(52) U.S. Cl.
  CPC ........... *H01M 10/6571* (2015.04); *B60L 7/12* (2013.01); *B60L 11/1805* (2013.01);
  (Continued)

(58) Field of Classification Search
  CPC ........... H01M 10/6571; H01M 10/615; H01M 10/625; H01M 10/63; H01M 10/441;
  (Continued)

(56) References Cited

U.S. PATENT DOCUMENTS

2005/0264257 A1* 12/2005 Inui .......................... B60L 1/10
    320/104
2012/0318783 A1* 12/2012 Kamachi .............. H05B 1/0236
    219/497

FOREIGN PATENT DOCUMENTS

JP  2000-40536 A  2/2000

OTHER PUBLICATIONS

Machine Translation of Tanihata JP 2000-040536, Mar. 28, 2017.*

* cited by examiner

*Primary Examiner* — Brian Jennison
(74) *Attorney, Agent, or Firm* — Birch, Stewart, Kolasch & Birch, LLP

(57) ABSTRACT

A vehicle electric battery controlling apparatus is applied to a vehicle including an on-board charger to charge a battery in the vehicle with power supplied from an external power source, a heater to warm the battery, and a DC-DC converter to reduce the voltage of power from the battery and then supply the battery power to the heater. The vehicle electric battery controlling apparatus includes a DC-DC converter controller to drive the DC-DC converter to supply the battery power to the heater before the charge of the battery by the on-board charger, and an on-board charger controller to drive the on-board charger such that the power source for the heater is gradually shifted from the battery to the external power source, after the DC-DC converter is driven.

15 Claims, 3 Drawing Sheets

(51) Int. Cl.
  *H01M 10/44*   (2006.01)
  *H01M 10/625*  (2014.01)
  *H01M 10/615*  (2014.01)
  *B60L 7/12*    (2006.01)
  *B60L 11/18*   (2006.01)

(52) U.S. Cl.
  CPC ....... *B60L 11/1816* (2013.01); *B60L 11/1861* (2013.01); *B60L 11/1864* (2013.01); *B60L 11/1868* (2013.01); *H01M 10/441* (2013.01); *H01M 10/615* (2015.04); *H01M 10/625* (2015.04); *H01M 10/63* (2015.04); *B60L 2210/10* (2013.01); *B60L 2210/30* (2013.01); *B60L 2230/12* (2013.01); *B60L 2240/545* (2013.01); *B60L 2240/547* (2013.01); *B60L 2240/549* (2013.01); *H01M 10/443* (2013.01); *Y02T 10/7005* (2013.01); *Y02T 10/7044* (2013.01); *Y02T 10/7061* (2013.01); *Y02T 10/7066* (2013.01); *Y02T 10/7088* (2013.01); *Y02T 10/7216* (2013.01); *Y02T 10/7241* (2013.01); *Y02T 90/121* (2013.01); *Y02T 90/127* (2013.01); *Y02T 90/14* (2013.01)

(58) Field of Classification Search
  CPC ......... H01M 10/443; B60L 7/12; B60L 11/18; B60L 11/1805; B60L 11/1816; B60L 11/1861; B60L 11/1868; B60L 2210/10; B60L 2210/30; B60L 2230/12; B60L 2240/545; B60L 2240/547; B60L 2240/549; B60L 11/1801; B60L 11/1809; B60L 11/1811

See application file for complete search history.

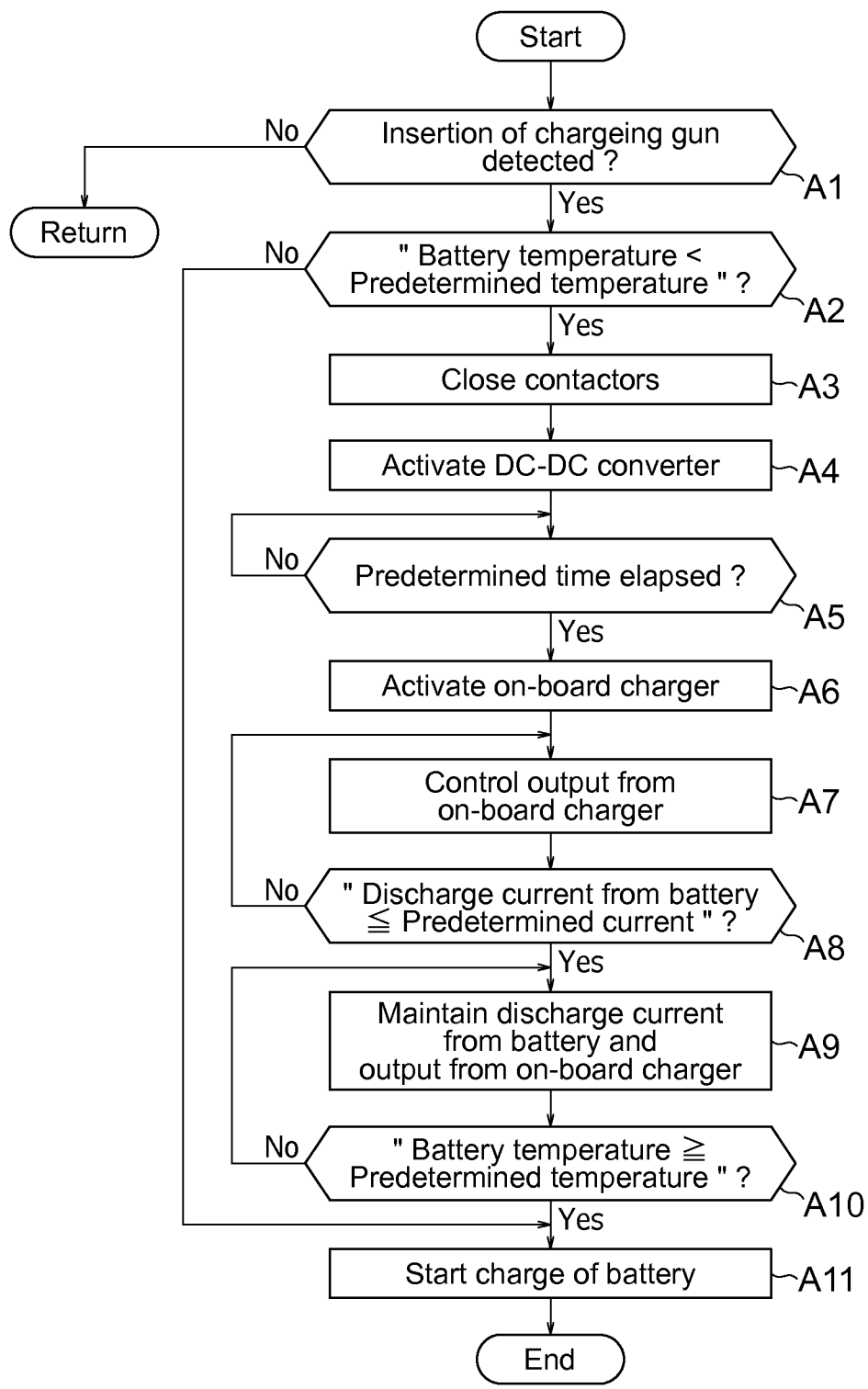

VEHICLE ELECTRIC BATTERY CONTROLLING APPARATUS

CROSS-REFERENCE TO THE RELATED APPLICATION

This application incorporates by references the subject matter of Application No. 2014-036298 filed in Japan on Feb. 27, 2014 on which a priority claim is based under 35 U.S.C. §119(a).

FIELD

The present invention relates to a vehicle electric battery controlling apparatus for controlling the external charge of a cold electric battery in a vehicle.

BACKGROUND

Conventional electric batteries installed in electric vehicles, such as electric and hybrid cars, for driving the vehicles are charged with power sources outside the vehicles. In other words, domestic power sources are used to charge the electric batteries of the electric vehicles. In such electric vehicles, the electric batteries can be readily charged through charging cables connecting on-board chargers with outlets of the external power sources.

The performance of electric batteries varies depending on the temperature of the environment of usage. For example, electric batteries at low temperature can supply lower power than those at ordinary temperature. The same phenomenon also occurs in the charging characteristics, i.e., the charge currents to electric batteries at low temperature hardly increase in some cases. In a technique to solve these problems, an electric battery provided with a thermosensor, an electric heater, and an air-conditioning unit is charged at a temperature controlled within a predetermined range.

For example, the temperature of an electric battery is detected upon the start of a vehicle in a cold environment. If the detected temperature is lower than a predetermined temperature, the electric battery is warmed to a higher temperature and then is charged. The electric battery can be warmed by an electric heater, or the internal heat generated during the charge-discharge cycles of the electric battery (refer to Japanese Unexamined Patent Application Publication No. 2000-040536).

Unfortunately, the charging and discharging characteristics of the electric battery significantly deteriorate, for example, at a cryogenic temperature (deep freeze temperature) substantially below 0° C., as described above. It thus takes a long time to warm the electric battery by the Joule heat generated during the charge-discharge cycles of the electric battery. In addition, the electric battery charged at a cryogenic temperature readily deteriorates and may have a shorter service life.

The deterioration of the electric battery can be prevented through the electrical disconnection of the cold electric battery from an external power source and the warming of the electric battery by the electric heater alone. Unfortunately, the electric battery is disconnected from a circuit for supplying power (external power) from the external power source, and thus cannot provide a buffering effect (effect of reducing fluctuations in the voltage). In other words, the voltage fluctuations in the external power source directly affect an inverter or a converter for converting the external power into low-voltage DC (Direct Current) power, resulting in an error in their operations.

SUMMARY

Technical Problems

An object of the invention, which has been accomplished to solve the above problems, is to provide a vehicle electric battery controlling apparatus having higher performance to protect a battery and devices in a circuit for charging the battery. Another object of the invention is to provide advantageous effects that are derived from the individual features described in the Description of Embodiments below but not from conventional techniques.

Solution to Problems (1) A vehicle electric battery controlling apparatus disclosed herein is applied to a vehicle including an on-board charger to charge a battery in the vehicle with power supplied from an external power source, a heater to warm the battery, and a DC-DC converter (voltage depressor, step-down converter) to reduce the voltage of power from the battery and then supply the battery power to the heater. The electric battery controlling apparatus includes a DC-DC converter controller to drive the DC-DC converter to supply the battery power to the heater before the charge of the battery by the on-board charger. The electric battery controlling apparatus further includes an on-board charger controller to drive the on-board charger such that a power source for the heater is gradually shifted from the battery to the external power source, after the DC-DC converter is driven.

(2) The DC-DC converter controller preferably drives the DC-DC converter to supply the battery power to the heater at a temperature of the battery lower than a predetermined temperature.

In other words, if the battery is at a low temperature, the DC-DC converter controller preferably drives the DC-DC converter and then drive the on-board charger with the external power source. The battery is preferably charged with the power from the external power source after the sufficient warm-up of the battery.

(3) The on-board charger controller preferably operates the heater by the power from the external power source while maintaining a discharge mode of the battery.

For example, the current and voltage output from the on-board charger is preferably controlled such that the discharge current from the battery has a predetermined positive value or higher.

(4) The on-board charger controller preferably controls the discharge current from the battery in the discharge mode to be equal to or higher than a value that absorbs fluctuations in the current output from the on-board charger.

For example, the discharge current is preferably higher than a variation in the current output from the on-board charger.

(5) The on-board charger controller preferably starts the shift from the battery to the external power source, after the DC-DC converter is driven by the DC-DC converter controller for a predetermined time.

The predetermined time is preferably determined based on, for example, a time required for stabilization of the operation of the DC-DC converter.

Advantageous Effects

The vehicle electric battery controlling apparatus gradually shifts the power supplied to the heater from battery power to power from an external power source and thus can certainly protect a battery.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein:

FIG. 3 is a flowchart illustrating a control process for warming a battery; and

DESCRIPTION OF EMBODIMENTS

A vehicle electric battery controlling apparatus according to embodiments will now be described with reference to the accompanying drawings. The embodiments below are mere examples and do not intend to exclude application of various modifications or techniques that are not described in the embodiments. The individual features of the embodiments may be modified in various manners without departing from the gist and/or selectively employed as necessary or properly combined with one another.

[1. Apparatus]

Figure 1:
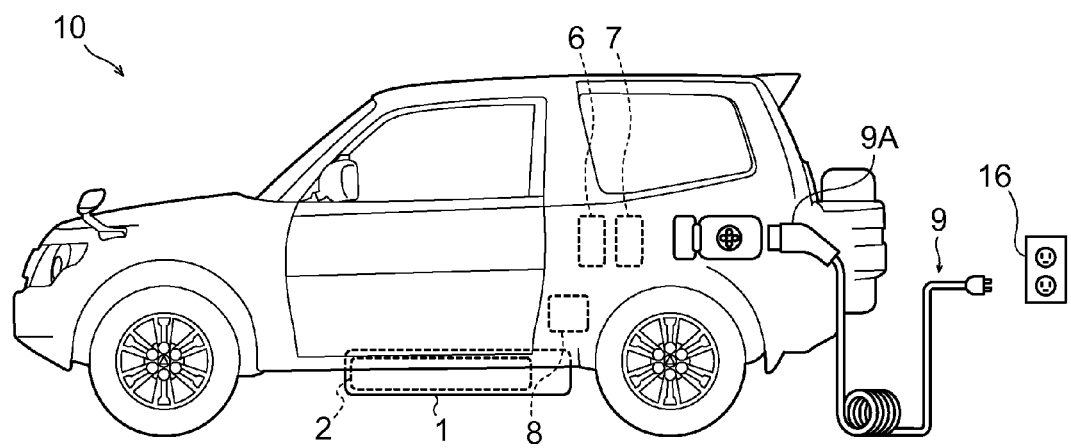
FIG. 1 is a schematic side view of a vehicle provided with an electric battery controlling apparatus according to an embodiment.

An electric battery controlling apparatus according to an embodiment is applied to a vehicle 10 illustrated in FIG. 1. The vehicle 10 is an electric or hybrid car including a drive motor driven by power from a battery 2. The vehicle 10 is equipped with a battery pack 1 including the battery 2 therein. The battery 2 can be charged with power regenerated in the drive motor and power from an external power source. The charge of the battery 2 starts in response to, for example, the connection of a charging gun 9A at an end of a charging cable 9 to a connector at a side of the vehicle body and the connection of the other end to a domestic electrical outlet 16. The AC (Alternating Current) power supplied from the external power source is converted by an on-board charger 7 into DC power and is stored in the battery 2.

The vehicle 10 includes a DC-DC converter 6 (voltage depressor, step-down converter) to reduce the voltage of the power from the battery 2 and supply the battery power to various electrical components. The voltage of several hundred volts from the battery 2 is reduced to approximately a dozen volt. The operations of the DC-DC converter 6 and the on-board charger 7 are controlled by an electronic control unit 8. The battery pack 1 also includes a heater 4 therein for warming the battery 2.

Figure 2:
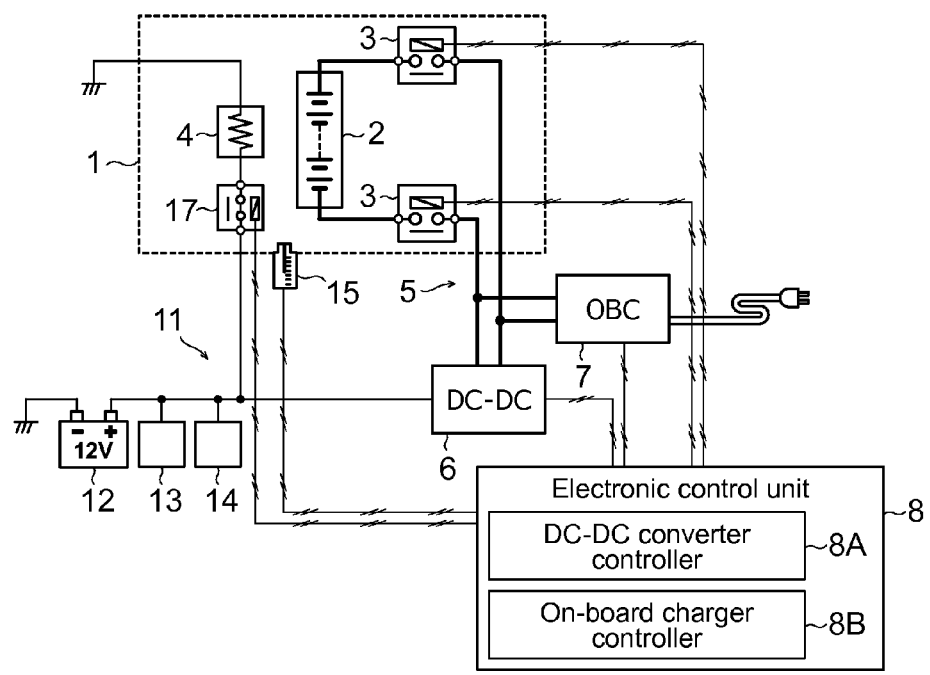
FIG. 2 is a schematic diagram illustrating an electric circuit installed in the vehicle illustrated in FIG. 1.

FIG. 2 illustrates an electric circuit connected to the battery 2. The battery 2 is connected to the on-board charger 7 via a high-voltage circuit 5, which includes contactors 3. The contactors 3 are electromagnetic switches functioning as normally energized relays to open or close the high-voltage circuit 5. The contactors 3 are closed while receiving control signals from the electronic control unit 8 to close (connect) the circuit, and are opened while receiving no control signal to open (disconnect) the circuit.

The DC-DC converter 6 is connected to the high-voltage circuit 5 connecting the contactors 3 and the on-board charger 7. The low-voltage power generated by the DC-DC converter 6 is supplied to a low-voltage circuit 11 including the heater 4, an accessory battery 12, an air-conditioning unit 13, and an on-board control unit 14. Apart of the low-voltage circuit 11 connecting between the heater 4 and the DC-DC converter 6 includes a heater switch 17 for control of power supply to the heater 4. The heater switch 17 is opened or closed under the control of the electronic control unit 8. The battery pack 1 further includes a thermosensor 15 therein for detection of the temperature of the battery 2. The detected information on the battery temperature is transmitted to the electronic control unit 8.

A charge or discharge mode of the battery 2 is determined based on the magnitude relationship between the battery voltage and the voltage in the high-voltage circuit 5. For example, when the voltage output from the on-board charger 7 is higher than the battery voltage, the battery 2 is charged with the power from the on-board charger 7. In contrast, when the voltage output from the on-board charger 7 is lower than the battery voltage, the battery 2 is not charged.

While the electrical components in the low-voltage circuit 11 are acting as loads during the operation of the DC-DC converter 6, the power from the high-voltage circuit 5 is consumed in the low-voltage circuit 11. During the charge of the battery 2, the power consumed in the low-voltage circuit 11 is equal to the difference between the power (external power) supplied from the external power source and the power charged to the battery 2. In contrast, during the discharge of the battery 2, the power consumed in the low-voltage circuit 11 is equal to the sum of the external power supplied from the external power source through the on-board charger 7 and the power discharged from the battery 2. The electronic control unit 8 increases or decreases the output from the on-board charger 7 on the basis of these characteristics, to control the charge or discharge mode of the battery 2 while operating the electrical components in the low-voltage circuit 11.

[2. Control]

The electronic control unit (electric battery controlling apparatus) 8 consists of a computer performing various controls on the charge and discharge of the battery 2, for example, an LSI (Large Scale integrated circuit) device or an embedded electronic device into which a microprocessor, a ROM (Read Only Memory), and a RAM (Random Access Memory) are integrated. The electronic control unit 8 executes various controls on the battery 2, and determines a charged state and a temperature of the battery 2 and a current and a voltage in the high-voltage circuit 5. The explanation in the embodiment focuses on a battery warming control executed upon the external charge of the battery 2 at a cryogenic temperature.

The battery warming control starts if the charging gun 9A is inserted into the connector for enabling power supply from the external power source at a battery temperature lower than a predetermined temperature (e.g., 0° C. to −30° C.). At a battery temperature equal to or higher than the predetermined temperature, normal external charge (normal charging control) is executed.

In the battery warming control, the heater 4 is driven by both the external power and the battery power. In other words, the contactors 3 are maintained at the closed state during the battery warming control, to utilize the buffering effect of the battery 2. Furthermore, the voltage of the high-voltage circuit 5 is controlled to maintain the discharge mode of the battery 2 all the time. This control can prevent the battery 2 from deteriorating due to the charge at a cryogenic temperature.

The control should not consume an excess amount of power from the battery 2 although the control continues only until sufficient warm-up of the battery 2. The output from the on-board charger 7 is thus controlled to minimize the discharge from the battery 2. The minimized discharge contains a margin for fluctuations in current and voltage applied by the external power source and variations of loads. For example, the minimized discharge is controlled to several tens of watts to several hundred watts.

In order to ensure a sufficient time from the start of the battery warming control to the stabilization of the current and voltage in the high-voltage circuit 5, the on-board charger 7 is activated after the elapse of a predetermined time from the activation of the DC-DC converter 6 (i.e., from the start of the heater 4). The heater 4 is thus driven by the battery power alone immediately after the activation of the DC-DC converter 6. The on-board charger 7 is then activated after the elapse of the predetermined stabilization time, so that the heater 4 is supplied with both the external power and the battery power.

The respective percentages of the external power and the battery power in the power consumed in the heater 4 are controlled such that the battery power gradually decreases whereas the external power gradually increases. It is noted that the percentage of the battery power never reaches 0% and the percentage of the external power never reaches 100%, to ensure the minimized discharge of the battery 2.

The electronic control unit 8 includes a DC-DC converter controller BA and an on-board charger controller 8B to execute the battery warming control. These controllers may be achieved by electronic circuits (hardware), or may be programmed in the form of software. Alternatively, some of the functions of the controllers may be provided in the form of hardware while the other may be provided in the form of software.

The DC-DC converter controller 8A drives the DC-DC converter 6 to supply the battery power to the heater 4 if the battery temperature is lower than the predetermined temperature. In other words, the DC-DC converter 6 is driven before the charge of the battery 2 by the on-board charger 7. The heater 4 starts its operation in response to the closure of the heater switch 17 while the low-voltage circuit 11 is being supplied with power through the DC-DC converter 6. If the battery temperature is the predetermined temperature or higher, the DC-DC converter 6 may be deactivated. Alternatively, the heater switch 17 may be opened instead of the deactivation of the DC-DC converter 6, to continue the power supply to the electrical components, such as the air-conditioning unit 13 and the on-board control unit 14.

The on-board charger controller 8B drives the on-board charger 7 such that the power supplied to the heater 4 is gradually shifted (changed) from the battery power to the external power, after the DC-DC converter 6 is driven. The power is shifted by increasing or decreasing the voltage and current output from the on-board charger 7. The voltage output from the on-board charger 7 is controlled not to exceed the battery voltage. This control maintains the discharge mode of the battery 2, so that the heater 4 is supplied with both the external power and the battery power.

The on-board charger 7 is activated after the DC-DC converter 6 is driven for at least the predetermined time. The predetermined time is a time required for stabilizing the operation of the DC-DC converter 6, for example, several seconds to several tens of seconds.

The discharge current from the battery 2 is equal to or higher than a value that can absorb at least fluctuations in the current output from the on-board charger 7. The current output from the on-board charger 7 fluctuates in response to fluctuations in the voltage applied by the external power source or fluctuations in the power consumed in the low-voltage circuit 11 through the DC-DC converter 6. In order to absorb such fluctuations in the output current, the discharge current from the battery 2 is designed to be higher than a variation in the current output from the on-board charger 7.

If the battery temperature is the predetermined temperature or higher, the on-board charger controller 85 executes the normal charging control to charge the battery 2 with the external power.

FIG. 3 is a flowchart illustrating an example process of the battery warming control. Whether the charging gun 9A is inserted into the connector of the vehicle 10 is determined in Step A1, and then whether the battery temperature is lower than the predetermined temperature is determined in Step A2. If these conditions for starting the battery warming control are satisfied, then the contactors 3 are closed (Step A3) and the DC-DC converter 6 is activated (Step A4).

After the elapse of the predetermined time (Step A5), the on-board charger 7 is activated (Step A6), and the output from the on-board charger 7 is controlled such that the output (discharge current) from the battery 2 gradually decreases (Step A7). As the output from the battery 2 decreases, the output from the on-board charger 7 gradually increases, so that the burden of supplying power to the heater 4 is shifted from the battery 2 to the external power source. Whether the discharge current from the battery 2 decreases to a predetermined current or lower is determined in Step A8. If yes, the shares of the burden of supplying power to the heater 4 are fixed. This control maintains the discharge current from the battery 2 and the output from the on-board charger 7 (Step A9). If the battery temperature reaches the predetermined temperature (Step A10), the heater switch 17 is opened to start the normal charging control on the battery 2 (Step A11).

FIGS. 4A to 4F are time charts illustrating operations under the battery warming control. The battery warming control starts if the battery temperature is lower than the predetermined temperature at a time $t_1$ when the charging gun 9A is inserted into the connector. In this case, the contactors 3 are closed immediately after the time $t_1$, and then the DC-DC converter 6 is activated at a time $t_2$, for example. It is noted that the DC-DC converter 6 may also be activated before the closing of the contactors 3.

The on-board charger 7 is activated at a time $t_3$ after the elapse of a predetermined time T from the time $t_2$ for the activation of the DC-DC converter 6. The operation of the DC-DC converter 6 is stabilized between the times $t_2$ and $t_3$. Accordingly, the power supplied to the low-voltage circuit 11 is always stable regardless of the supply of the external power to the high-voltage circuit 5 at the time $t_3$.

The output from the on-board charger 7 is controlled such that the power supplied to the heater 4 is gradually shifted from the battery power to the external power. For example, the current output from the on-board charger 7 is zero at the time $t_3$, and gradually increases with time. The voltage output from the on-board charger 7 is designed to be lower than the voltage of the battery 2. Such a gradual shift of the burden of power leads to a slow decrease in the discharge current from the battery 2.

If the discharge current from the battery 2 reaches a predetermined current $B_1$ at a time $t_4$, the output from the on-board charger 7 at that time is maintained, and the discharge current from the battery 2 is also maintained at the predetermined current $B_1$. The predetermined current $B_1$ is higher than a variation in the current output from the on-board charger 7. The discharge current from the battery 2 is thus always positive (i.e., the charge current is always negative) regardless of fluctuations in the voltage of the external power source.

Figure 4A:
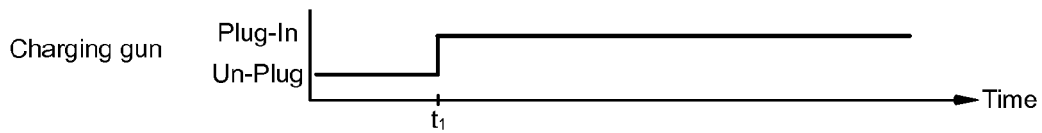
FIG. 4A is a graph illustrating insertion of a charging gun.
Figure 4B:
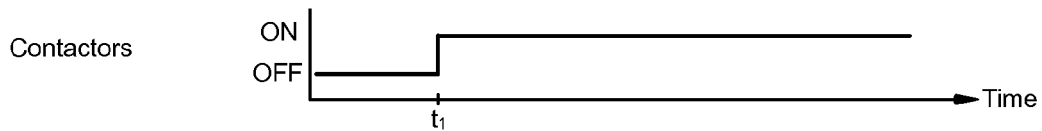
FIG. 4B is a graph illustrating closing of contactors.
Figure 4C:
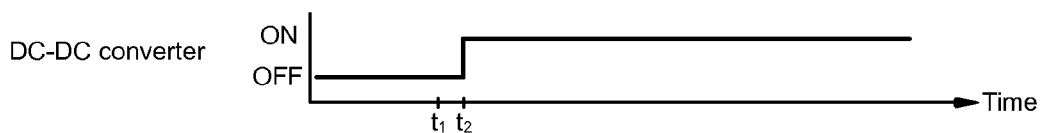
FIG. 4C is a graph illustrating an operation of a DC-DC converter.
Figure 4D:
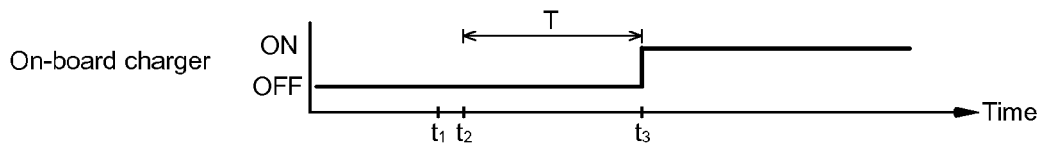
FIG. 4D is a graph illustrating an operation of an on-board charger.
Figure 4E:
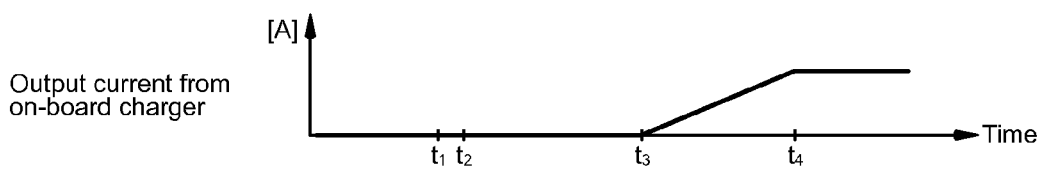
FIG. 4E is a graph illustrating current output from an on-board charger.
Figure 4F:
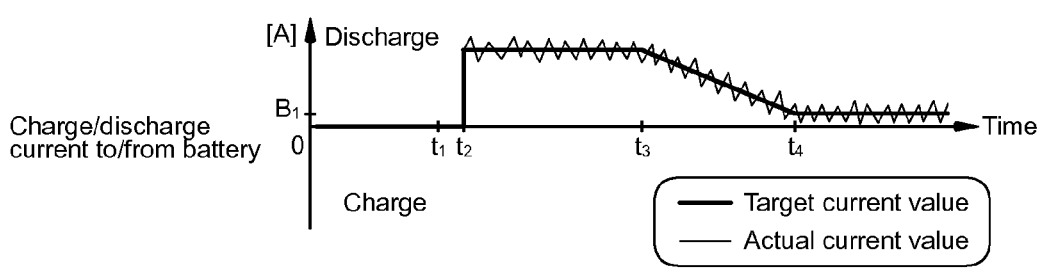
FIG. 4F is a graph illustrating charge or discharge current to or from a battery.

For example, an actual discharge current illustrated with a thin solid line in FIG. 4F fluctuates up and down (oscillates) around a target discharge current illustrated with a thick solid line. In the battery warming control, the lower limit of the target discharge current is the predetermined current $B_1$, so that the actual discharge current from the battery 2 never falls below zero and the discharge mode of the battery 2 is maintained all the time.

3. Advantageous Effects (1) The battery warming control gradually shifts the power supplied to the heater 4 from the battery power to the external power. This control can prevent the battery 2 from being charged with the external power in response to minute fluctuations in the voltage, and thus can enhance the protection of the battery 2. In other words, the control can avoid internal short-circuit caused by a charging operation while increasing the battery temperature, and thus can enhance the protection of the battery 2.

Through the gradual shift of the power supplied to the heater 4 from the battery power to the external power, the battery 2 can be warmed by the external power without excess consumption of the battery power. In other words, this control can rapidly warm the battery 2 from a cryogenic temperature to a proper temperature and charge the battery 2 at the proper temperature. In addition, the buffering effect of the battery 2 can absorb fluctuations in the voltage in the high-voltage circuit 5, resulting in enhanced protection of the DC-DC converter 6 and the on-board charger 7.

(2) The battery warming control drives the heater 4 by the external power while maintaining the discharge mode of the battery 2. In other words, the control involves a gradual decrease in the discharge current from the battery 2 and the maintenance of the discharge current at the predetermined positive value or higher. This control also prevents the charge of the battery 2 in response to minute fluctuations in the voltage, and thus can enhance the protection of the battery 2.

(3) During the battery warming control, the discharge current from the battery 2 in the discharge mode is equal to or higher than a value (predetermined current $B_1$) that can absorb fluctuations in the current output from the on-board charger 7. This control can certainly prevent charge current flow in the battery 2, and thus can avoid unintentional charge of the battery 2 and enhance the protection of the battery 2.

(4) The battery warming control activates the on-board charger 7 to start the shift from the battery power to the external power after the predetermined time T for operating the DC-DC converter 6, as illustrated in FIGS. 4C and 4D. Such a sufficient operating time (predetermined time T) immediately after the activation of the DC-DC converter 6 can stabilize the operation of the DC-DC converter 6, and can reduce fluctuations in the power supplied to the low-voltage circuit 11. The stabilization of fractuations of the power consumed in the low-voltage circuit 11 leads to reductions in fluctuations in the current and voltage in the high-voltage circuit 5 and thus enhances protection of the battery 2, the DC-DC converter 6, and the on-board charger 7.

(5) The conditions for starting the battery warming control include the battery temperature lower than the predetermined temperature. In other words, the heater 4 is deactivated if the battery 2 is sufficiently warm. Furthermore, the DC-DC converter 6 is deactivated in resting states of the electrical components, such as the air-conditioning unit 13 and the on-board control unit 14. This control can supply all the external power to the battery 2 to charge with economy.

In contrast, if the battery 2 is not sufficiently warm, the battery 2 is warmed by both the internal heat of the battery 2 and the external power. This control can warm the battery 2 by the Joule heat generated during the discharge cycle of the battery 2 while certainly operating the heater 4, and thus can reduce the time required for making the battery 2 chargeable. In addition, the contactors 3 remain closed during the battery warming control, as illustrated in FIG. 4B. This control can stabilize the operations of the DC-DC converter 6 and the on-board charger 7 by the buffering effect of the battery 2.

The invention should not be construed to be limited to the above-described embodiments and may be modified in various manners without departing from the gist. The individual features of the embodiments may be selectively employed as necessary or properly combined with one another.

In the above-explained battery warming control, the current output from the on-board charger 7 and the discharge current from the battery 2 each vary with a constant gradient, as illustrated in FIGS. 4E and 4F. Alternatively, these currents may vary in any other manner. The control at least gradually shifts the power supplied to the heater 4 such that the percentage of the battery power in the power consumed in the heater 4 gradually decreases.

In the above-explained battery warming control, the battery 2 is warmed by the heater 4 installed in the battery pack 1. Alternatively, the battery 2 may be warmed by the on-board air-conditioning unit 13 instead of or in addition to the heater 4. In this case, the power supplied to the air-conditioning unit 13 is gradually shifted from the battery power to the external power.

The conditions for starting the battery warming control include any condition other than the above-described conditions. For example, the battery warming control may also start in advance of the external charge, regardless of the battery temperature. Alternatively, the battery warming control may start in response to a requesting operation from a user of the vehicle 10. The battery warming control starts to stabilize the operations of the DC-DC converter 6 and the on-board charger 7 at least before the external charge of the battery 2.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCE SIGNS LIST 2 battery
4 heater

6 DC-DC converter (voltage depressor, step-down converter)
7 on-board charger
8 electronic control unit (electric battery controlling apparatus)
8A DC-DC converter controller
8B on-board charger controller
10 vehicle

The invention claimed is:

1. A vehicle electric battery controlling apparatus for a vehicle comprising an on-board charger to charge a battery in the vehicle with power supplied from an external power source, a heater to warm the battery, and a DC-DC converter to reduce voltage of power from the battery and then supply the battery power to the heater, the vehicle electric battery controlling apparatus comprising:
a DC-DC converter controller to drive the DC-DC converter to supply the battery power to the heater before the charge of the battery by the on-board charger; and
an on-board charger controller configured to drive the on-board charger such that a power source for the heater is shifted from only the battery to a combination of the battery and the external power source, after the DC-DC converter is driven, the on-board charger increases an output current such that a discharge current from the battery reduces while following a predetermined current reduction rate until the discharge current from the battery reduces to a predetermined value greater than zero (0).

2. The vehicle electric battery controlling apparatus according to claim 1, wherein the DC-DC converter controller drives the DC-DC converter to supply the battery power to the heater at a temperature of the battery lower than a predetermined temperature.

3. A vehicle electric battery controlling apparatus for a vehicle comprising an on-board charger to charge a battery in the vehicle with power supplied from an external power source, a heater to warm the battery, and a DC-DC converter to reduce voltage of power from the battery and then supply the battery power to the heater, the vehicle electric battery controlling apparatus comprising:
a DC-DC converter controller to drive the DC-DC converter to supply the battery power to the heater before the charge of the battery by the on-board charger; and
an on-board charger controller to drive the on-board charger such that a power source for the heater is gradually shifted, while controlling a discharge current from the battery follows a target current reduction rate, from the battery to a combination of the battery and the external power source, after the DC-DC converter is driven,
wherein the on-board charger controller operates the heater by the power from the external power source while maintaining a discharge mode of the battery.

4. The vehicle electric battery controlling apparatus according to claim 2, wherein the on-board charger controller operates the heater by the power from the external power source while maintaining a discharge mode of the battery.

5. The vehicle electric battery controlling apparatus according to claim 3, wherein the on-board charger controller controls discharge current from the battery in the discharge mode to be equal to or higher than a value that absorbs fluctuations in current output from the on-board charger even after the gradual shift of the power source from the battery to the external power source has completed.

6. The vehicle electric battery controlling apparatus according to claim 4, wherein the on-board charger controller controls discharge current from the battery in the discharge mode to be equal to or higher than a value that absorbs fluctuations in current output from the on-board charger even after the gradual shift of the power source from the battery to the external power source has completed.

7. The vehicle electric battery controlling apparatus according to claim 1, wherein the on-board charger controller starts the shift from the battery to the external power source, after the DC-DC converter is driven by the DC-DC converter controller for a predetermined time.

8. The vehicle electric battery controlling apparatus according to claim 2, wherein the on-board charger controller starts the shift from the battery to the external power source, after the DC-DC converter is driven by the DC-DC converter controller for a predetermined time.

9. The vehicle electric battery controlling apparatus according to claim 3, wherein the on-board charger controller starts the shift from the battery to the external power source, after the DC-DC converter is driven by the DC-DC converter controller for a predetermined time.

10. The vehicle electric battery controlling apparatus according to claim 4, wherein the on-board charger controller starts the shift from the battery to the external power source, after the DC-DC converter is driven by the DC-DC converter controller for a predetermined time.

11. The vehicle electric battery controlling apparatus according to claim 5, wherein the on-board charger controller starts the shift from the battery to the external power source, after the DC-DC converter is driven by the DC-DC converter controller for a predetermined time.

12. The vehicle electric battery controlling apparatus according to claim 6, wherein the on-board charger controller starts the shift from the battery to the external power source, after the DC-DC converter is driven by the DC-DC converter controller for a predetermined time.

13. The vehicle electric battery controlling apparatus according to claim 1, wherein the target current reduction rate has a constant decreasing gradient.

14. The vehicle electric battery controlling apparatus according to claim 3, wherein the on-board charger controller controls discharge current from the battery in the discharge mode to be equal to or higher than a value that absorbs fluctuations in current output from the on-board charger even after the gradual shift of the power source from the battery to the external power source has completed, a voltage output from the on-board charger being designated to be lower than a voltage of the battery.

15. The vehicle electric battery controlling apparatus according to claim 4, wherein the on-board charger controller controls discharge current from the battery in the discharge mode to be equal to or higher than a value that absorbs fluctuations in current output from the on-board charger even after the gradual shift of the power source from the battery to the external power source has completed, a voltage output from the on-board charger being designated to be lower than a voltage of the battery.

* * * * *